United States Patent
Desnoyer et al.

(10) Patent No.: US 9,908,534 B2
(45) Date of Patent: Mar. 6, 2018

(54) OPERATING METHOD FOR A VEHICLE IN MANUAL MODE AND IN AUTONOMOUS MODE

(71) Applicant: RENAULT s.a.s., Boulogne Billancourt (FR)

(72) Inventors: Francois Desnoyer, Paris (FR); Sabine Langlois, Paris (FR); Marc Lavabre, Vaucresson (FR)

(73) Assignee: RENAULT s.a.s., Boulogne Billancourt (FR)

( * ) Notice: Subject to any disclaimer, the term of this patent is extended or adjusted under 35 U.S.C. 154(b) by 32 days.

(21) Appl. No.: 14/893,855

(22) PCT Filed: May 15, 2014

(86) PCT No.: PCT/EP2014/059902
§ 371 (c)(1),
(2) Date: Nov. 24, 2015

(87) PCT Pub. No.: WO2014/191209
PCT Pub. Date: Dec. 4, 2014

(65) Prior Publication Data
US 2016/0107655 A1    Apr. 21, 2016

(30) Foreign Application Priority Data

May 27, 2013 (FR) .................................... 13 54744

(51) Int. Cl.
*B60W 50/08* (2012.01)
*B60W 30/12* (2006.01)
*B60W 50/14* (2012.01)
*B60W 30/16* (2012.01)
*B60W 50/00* (2006.01)
*B60K 28/06* (2006.01)

(52) U.S. Cl.
CPC .......... *B60W 50/082* (2013.01); *B60W 30/12* (2013.01); *B60W 30/16* (2013.01);
(Continued)

(58) Field of Classification Search
CPC .... B60W 50/082; B60W 50/14; B60W 30/16; B60W 30/12; B60W 50/0097; B60W 2050/0096; B60W 2550/402; B60K 28/06
See application file for complete search history.

(56) References Cited

U.S. PATENT DOCUMENTS 7,337,056 B2 * 2/2008 Arai ...................... B60W 30/16
701/301
9,688,288 B1 * 6/2017 Lathrop ................ B60W 50/14
(Continued)

FOREIGN PATENT DOCUMENTS

DE    10 2011 082 375 A1    3/2013
EP     2 314 490 A1    4/2011
(Continued)

OTHER PUBLICATIONS

Espacenet Translation of EP 2314490 (A1), Siedersberger et al, Apr. 27, 2011, 16 pages.*
(Continued)

*Primary Examiner* — Dale W Hilgendorf
(74) *Attorney, Agent, or Firm* — Oblon, McClelland, Maier & Neustadt, L.L.P.

(57) ABSTRACT

An operating method for a vehicle includes a driving in manual mode, in which a longitudinal movement and a lateral movement are controlled by a human driver, and a driving in autonomous mode, in which the longitudinal movement and the lateral movement are controlled by an automated system. In the method, an alerting of the human driver is activated in particular in autonomous mode when the automated system receives a first distance that separates the vehicle from an end of the zone in which the autonomous mode is authorized. An automatic stopping of the vehicle before reaching the zone end is activated in autonomous mode when the human driver does not resume control of the vehicle after receiving the first distance from the automated system.

9 Claims, 3 Drawing Sheets

(52) U.S. Cl.
CPC ............ *B60W 50/14* (2013.01); *B60K 28/06* (2013.01); *B60W 50/0097* (2013.01); *B60W 2050/0096* (2013.01); *B60W 2550/402* (2013.01)

(56) References Cited

U.S. PATENT DOCUMENTS

| | | | | |
|---|---|---|---|---|
| 2009/0043462 | A1* | 2/2009 | Stratton | E02F 9/2033 |
| | | | | 701/301 |
| 2010/0161195 | A1* | 6/2010 | Shin | B60W 30/16 |
| | | | | 701/300 |
| 2013/0211656 | A1* | 8/2013 | An | G05D 1/0221 |
| | | | | 701/25 |
| 2015/0241878 | A1* | 8/2015 | Crombez | B60W 30/16 |
| | | | | 701/23 |

FOREIGN PATENT DOCUMENTS

| | | | | |
|---|---|---|---|---|
| EP | 2314490 B1 * | 8/2012 | ............ | B60W 50/14 |
| FR | 2 915 164 A1 | 10/2008 | | |

OTHER PUBLICATIONS

International Search Report dated Jul. 2, 2014 in PCT/EP14/059902 Filed May 15, 2014.
French Search Report dated Jan. 23, 2014 in French Application 1354744 Filed May 27, 2013.

* cited by examiner

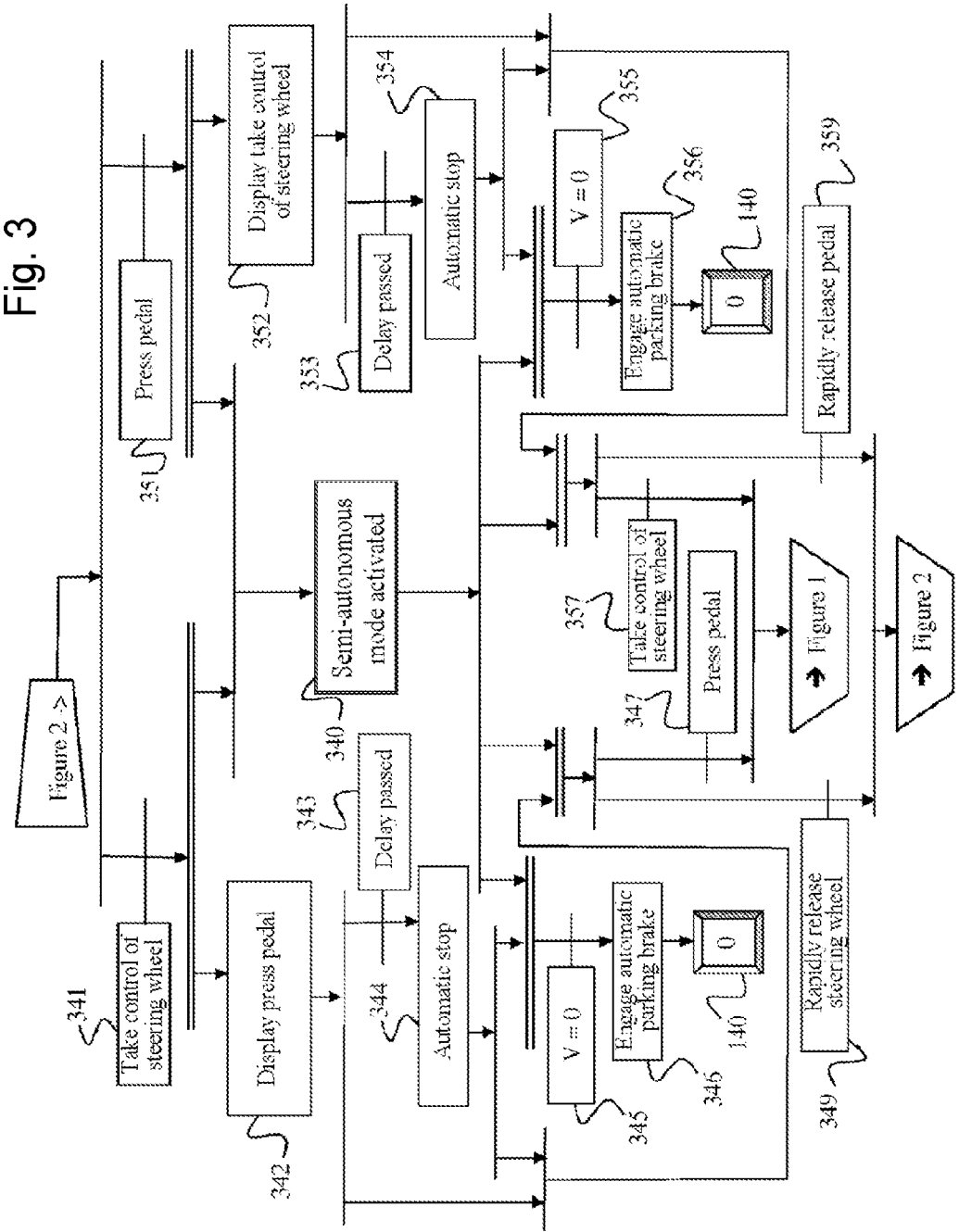

OPERATING METHOD FOR A VEHICLE IN MANUAL MODE AND IN AUTONOMOUS MODE

The invention relates to a method and an automated system for supervising operation of a vehicle in manual driving mode and in autonomous driving mode.

BACKGROUND

The driving assistance systems, for example remote controlled speed regulators, enable a human driver to be relieved of some of his or her driving activity on automated systems. These systems are currently widespread on the market, and their functions are increasingly associated with one another to render the vehicle completely autonomous. Such a vehicle type enables the driver to benefit from driving delegation services over all or part of the duration of his or her journey. These driving delegation services can notably be offered when the traffic conditions are dense and the average speed of the vehicle is sufficiently low. The manner in which the driver delegates the driving and in which the system hands control to the driver are absolutely essential to the quality of the service provided, and to the dependability of the system. There are procedures for activating and deactivating longitudinal control systems of the vehicle as in the case of a speed regulator or of a distance control system. There are also procedures for activating and deactivating lateral control systems like the line crossing detection systems or lane holding systems. For each of these systems taken separately, it is fairly easy for the driver to know if it is he or she who has control or if it is the automatic system. An autonomous vehicle system of the type to which the invention applies proposes coupling the longitudinal control of the vehicle with the lateral control. The autonomous mode is reserved for the zones in which the traffic conditions are compatible with an absence of human control. The zones are moreover defined to avoid to the maximum having the use of the autonomous mode create a hazard or an anxiety-producing situation therein.

To illustrate the prior state of the art, the document U.S. Pat. No. 8,352,110 discloses a user interface for displaying an internal autonomous driving system state. In manual mode, the interface indicates to the user that the system is ready to operate in autonomous mode based on a variety of information notably comprising a geographic location of the vehicle. The method and the system disclosed do however present a number of problems, including that of keeping the vehicle safe when a zone in which the autonomous mode is possible ends while the human driver has delegated his or her driving vigilance to the automated system.

BRIEF SUMMARY

The subject of the invention is a method for operating a vehicle comprising at least one step of driving in manual mode in which a longitudinal displacement and a lateral displacement are controlled by a human driver and at least one step of driving in autonomous mode in which the longitudinal displacement and the lateral displacement are controlled by an automated system.

To address the problems of the prior state of the art, a step of alerting the human driver is activated at least in autonomous mode when the automated system receives a first distance which separates the vehicle from an end of zone in which the autonomous mode is authorized.

A step of automatically stopping the vehicle before reaching the end of zone is activated in autonomous mode when the human driver does not take back control of the vehicle after the reception of said first distance by the automated system.

Preferably, the automated system computes a second distance making it possible to stop the vehicle as a function of a deceleration accessed and/or computed by the automated system to be used in the automatic stopping step.

Advantageously, the step of automatically stopping the vehicle is activated when said first distance is less than or equal to said second distance.

In particular, said second distance is computed from a maximum speed authorized over said first distance.

Also in particular, said deceleration is of constant gauged value for the vehicle and said second distance comprises a first length proportional to a square of speed of the vehicle and inversely proportional to twice said deceleration.

More particularly, said second distance comprises a fixed second length added to said first length.

An additional attraction added by the method results from the fact that said deceleration is of a value low enough to avoid prejudicing the comfort of the passengers of the vehicle.

Another subject of the invention is a computer program comprising program code instructions for the execution of the steps of the method according to the invention when said program is run on a computer.

Yet another subject of the invention is an automated system comprising a computer in which is installed a computer program according to the invention.

The final subject of the invention is a vehicle, notably a motor vehicle, comprising an automated system according to the invention.

BRIEF DESCRIPTION OF THE DRAWINGS

The invention will be better understood through examples of implementation of steps of the method according to the invention with reference to the attached drawings, in which:

FIG. 3 shows steps of the method according to the invention in semi-autonomous mode.

DETAILED DESCRIPTION

In the method for operating a vehicle explained with reference to FIG. 1, a step 144 of driving in manual mode consists in leaving a human driver to control a longitudinal displacement and a lateral displacement of the vehicle. The longitudinal displacement is then controlled in the usual way by means of manual speed control members of the vehicle such as the accelerator and brake pedals. The lateral displacement is similarly controlled in the usual way by means of manual steering control members of the vehicle, such as the steering wheel.

The step 144 thus reproduces a standard vehicle operation which, in the absence of the invention, could as it were be constantly activated.

A vehicle, notably a motor vehicle according to the invention, comprises an automated system in which automatic control actuators, otherwise known, are driven by a computer in which is installed a computer program comprising program code instructions for the execution of steps of the method explained below when the program is run on the computer. The computer is typically a computer embedded in the vehicle, capable of communicating with other embedded computers via a field network such as a Controller Area Network (CAN), Local Interconnect Network (LIN), or similar network and of optionally, but not necessarily, communicating with remote equipment items such as positioning satellites associated With an embedded navigation apparatus or such as centralized databases that can be accessed by a telecommunication apparatus.

The method is now explained by means of a grafcet representation in which it will be recalled that a transition following one or more preceding steps is validated by a detection of one or more predefined events when all or part of said preceding step or steps is/are active and that a validation of said transition activates one or more subsequent steps and deactivates said preceding step or steps, in accordance with the grafcet representation conventions. It will be understood that this representation has been chosen for the clarity that it provides and that it is in no way limiting. A representation in the form of a computer flow diagram, a combinational logic circuit or any other hardware mechanism, is similarly covered by the explanations which follow, the method not being limited beyond the actions which are executed in the steps which are essential to it and the conditions governing the execution of these actions.

In the method implemented for example by involving the automated system indicated above, the step 144 of driving in manual mode is preferably activated by default from an initial step 140, regardless of the possible driving modes, when the vehicle is started up by the human driver.

From the step 140, a transition 145 is validated when the driving of the vehicle in autonomous mode is possible and a transition 141 is validated when, conversely, the driving of the vehicle in autonomous mode is not possible.

Figure 1:
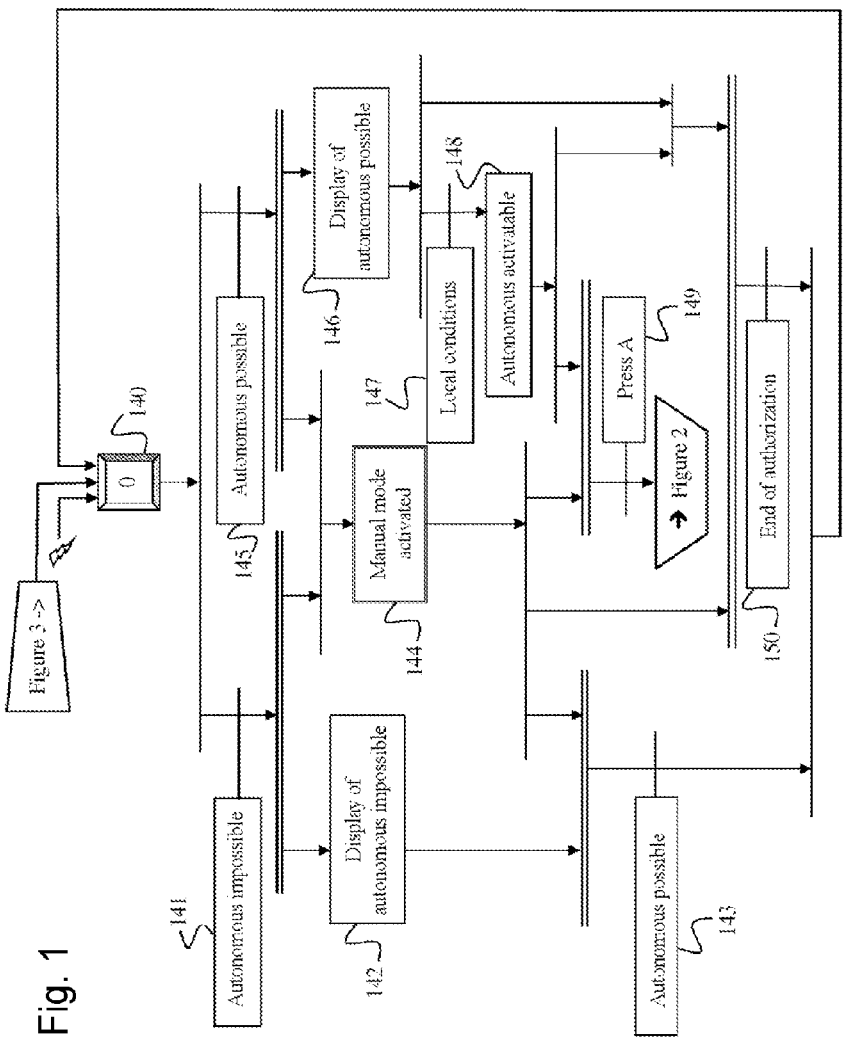
FIG. 1 shows steps of the method according to the invention in manual mode.

The purpose of the steps now described with reference to FIG. 1 is essentially to supervise a transition from manual driving mode to an autonomous driving mode explained later with reference to FIG. 2. In the autonomous driving mode, the longitudinal displacement and the lateral displacement of the vehicle are controlled by the automated system without intervention from the human driver.

The conditions for validation of the transition 145 are for example entered in a table in memory of the automated system. As a purely illustrative and non-exhaustive example, they can comprise a condition of speed of vehicle below a predefined threshold, a location of the vehicle in a zone appropriate to driving in autonomous mode, estimated in coordination with the navigation unit of the vehicle.

Parallel to the step 144 of activated manual mode which is activated regardless of which of the transitions 141 and 145 is validated, a step 146 of displaying driving in autonomous mode possible is activated when the transition 145 is validated and a step 142 of displaying driving in autonomous mode impossible is activated when the transition 141 is validated. The term displaying in the steps 142 and 146, to be taken in its widest sense, can denote both a visual and audible indication, permanent or on demand, and a simple absence of indication in the step 142 for example as long as the indication of step 146 is not present.

From a logical conjunction of the step 142 and of the step 144, a transition 143 is validated when the driving of the vehicle in autonomous mode becomes possible. From a logical conjunction of the step 146 and of the step 144, a transition 150 is validated when a transition from driving of the vehicle in autonomous mode is no longer authorized. The end of authorization of transition to autonomous mode which validates the transition 150 can result from a possible end of autonomous mode; it can also result from other events as will be seen hereinbelow.

A logical disjunction of validation of the transition 143 or of the transition 150, reactivates the initial step 140 for redirecting the automatic system to the appropriate branch of the manual operating mode.

From the step 146 activated subject to the stipulation that autonomous mode is possible, a transition 147 is validated when the conditions local to the vehicle are met. As an illustration, the lateral lane control with markers on the roadway being followed in progress, constitutes a local condition to the substitution of steering control by the human driver. An absence of torque applied to the steering wheel by the human driver made possible, notably by a straight-line trajectory, also constitutes a local condition to the substitution of steering control by the human driver. Again by way of illustration, the speed regulator activated with setpoint originating from the navigation unit to observe speed limitations constitutes a local condition to the substitution of acceleration control by the human driver. The collision detection system connected to various obstacle proximity sensors, radars and/or camera, to lower the speed setpoint so as to maintain a non-zero distance with the obstacle, whether fixed or mobile, also constitutes a local condition to the substitution of acceleration control by the human driver. Since pressing on the brake pedal always takes priority over the other members, automatic or manual, for safety reasons, a relaxation of the accelerator pedal reinforces or confirms the local conditions to be met to make it possible to effectively switch to autonomous mode.

A validation of the transition 147 activates a step 148 of autonomous mode activatable. In the step 148, the automated system signals to the human driver that it is ready to take control of the driving of the vehicle and prompts him or her to confirm, without any possible ambiguity, his or her will to transfer all of the control of the vehicle to the automated system in autonomous mode. For as long as the human driver does not clearly confirm his or her will to leave the manual mode, the computer of the automated system recognizes the commands from the human driver which result therefrom to drive the automatic control actuators. Simultaneously, the computer of the automated system arms a timer to measure the time during which the human driver keeps his or her hands on the steering wheel or his or her foot on one of the pedals.

If the measured time reaches a predefined delay, generally very short, of the order of a second, the transition 150 is validated so that the confirmation by the human driver of transition to autonomous mode, is short term after the local conditions which make it possible to leave the manual mode are met. It is preferable not to switch to autonomous mode too late, at a moment which could surprise the human driver or which would no longer be in accordance with the conditions for switching to autonomous mode at the instant at which the local conditions are met.

From a logical conjunction of the step 148 and of the step 144, a transition 149 is validated when the human driver explicitly formulates his or her request to switch to autonomous mode. The reception, in the automated system, of a signal indicating an explicit will of the human driver to switch to autonomous mode can result from a press on a button A, from a hand lever movement on the steering wheel by the human driver, from a selection on a touch screen, from a univocal voice recognition of an oral command spoken by the human driver possibly accompanied by a confirmation sequence, or from any other clearly deliberate command from the human driver explicit request to switch to autonomous mode.

A validation of the transition 149 then activates the step 244 of driving in autonomous mode now explained with reference to FIG. 2.

In the autonomous driving mode, the automated system handles all of the control both in longitudinal displacement and in lateral displacement of the vehicle in order to rest the lower and upper limbs of the human driver and free him or her of certain tedious tasks such as those of constantly concentrating on his or her speedometer and the road signs to ensure that a speed limit is not being infringed.

The human driver can rest his or her feet as best seems fit as with a conventional speed regulator. Unlike a conventional speed regulator for which the speed setpoint is set by the human driver then kept constant until the human driver modifies it, the speed setpoint is here adapted according to speed limits indicated by the maps of the navigation apparatus or the speed of a vehicle in front whose distance is evaluated by a radar rangefinder or a camera.

Similarly, the human driver can rest his or her hands as best seems fit because the conventional trajectory and stability control is supplemented by a lane recognition mechanism on the road through a camera in combination with an itinerary given by the navigation apparatus.

Figure 2:
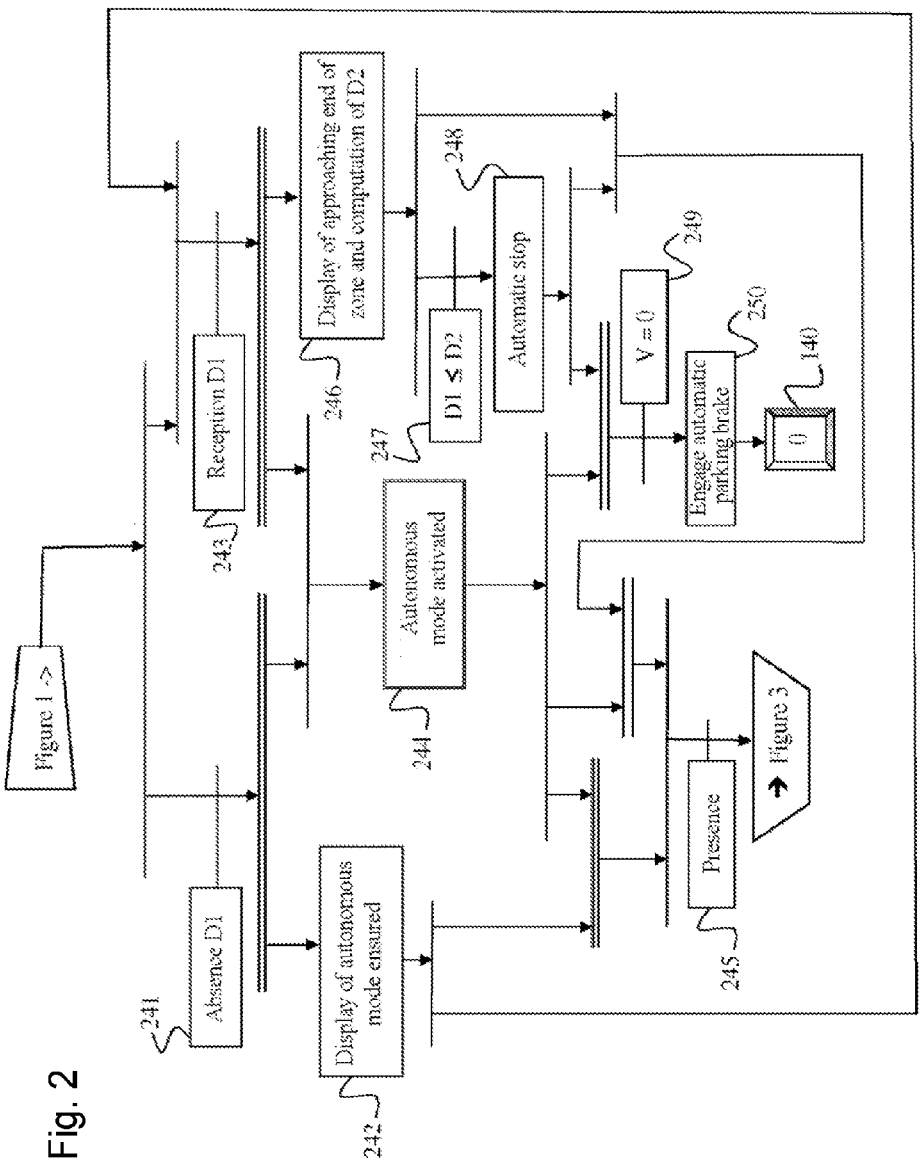
FIG. 2 shows steps of the method according to the invention in autonomous mode.

The autonomous mode illustrated by FIG. 2 comprises, on the one hand, a step 242 of displaying autonomous mode ensured, activated by a transition 241 which is validated as long as the end of the zone in which the vehicle can travel in autonomous mode safely is not known.

The example of autonomous mode illustrated by FIG. 2 comprises, on the other hand, a step 246 of displaying approaching end of zone, activated by a transition 243 which is validated when the automated system receives a distance value D1 which separates the vehicle from the end of the zone in which the autonomous mode is authorized. The distance value D1 is for example given by a navigation unit of GPS type or similar which has a road map and road traffic conditions. By way of illustration, it is possible to mention the situations in which the navigation unit identifies the end of delegated driving zone, which corresponds to an entry into another zone in which traffic becomes more fluid or else in which the infrastructure alters: toll, highway exit, or even corresponds to the presence of an incident on the itinerary: works, accident or similar.

The step 246 makes it possible to alert the human driver so that he or she will soon be ready to take back control of the vehicle. Optionally, provision can be made to permanently display the distance D1 which decreases in real time as the vehicle approaches the end of zone so as to help the human driver take the decision to take back the control of the vehicle, in other words regarding the return to manual mode.

In any case, the automated system receives, in real time, the distance value D1 so as to compute, in step 246, a distance D2 which makes it possible to gently stop the vehicle at end of zone for the case where the human driver has not taken back control of the vehicle before the end of zone.

To this end, the automated system contains in memory a gauged deceleration to a value sufficiently low to avoid prejudicing the comfort of the passengers of the vehicle. The deceleration gauging value is also high enough to be perceptible by the human driver so as to attract his or her attention and not require an excessively long distance D2 to stop. A good compromise is obtained with a deceleration value of 1 m/s². It will be understood that this value can differ substantially within a range which varies between 0.7 m/s² and 1.6 m/s² without prejudicing the expected behavior of the vehicle.

The automated system accesses the gauged deceleration value γ contained in memory or computes a deceleration value in a predetermined range. In parallel, the automated system asks the navigation unit for a maximum speed value $V_{max}$ authorized over the distance D1 which separates the vehicle from the end of zone so as to compute the stopping distance D2 at end of zone.

For example, with a constant gauged deceleration value for the vehicle, the automated system computes a first stopping distance length D2, proportional to a square of speed of the vehicle and inversely proportional to twice said deceleration:

$$D2 := \frac{V_{max}^2}{2 \cdot \gamma}$$

To guarantee an error margin, the automated system can uprate the value previously obtained, for example by roughly 10%:

$$D2:=1.1 D2$$

When it is best to stop before rather than after the end of zone, the automated system adds a second fixed length c, for example of 10 meters, to D2.

$$D2:=D2+\epsilon.$$

As long as the step 246 is active, a transition 248 is validated when the end-of-zone distance D1 becomes less than or equal to the stopping distance D2.

Thus, a validation of the transition 248 makes it possible to activate a step 248 of automatic stopping of the vehicle before reaching the end of zone, when the human driver does not take back control of the vehicle after the automated system receives the distance D1, so as to avoid continuing to travel in autonomous mode outside of the authorization zone.

In the step 248, the automated system slows down the vehicle by applying to it, in autonomous mode, the gauged deceleration defined above.

In this way, if a resumption of control by the human driver is not detected when the distance threshold D2 is reached or crossed, the automated system triggers an automatic stopping procedure which brings the vehicle to a stop while maintaining the lateral control active. The visual display on the screens and the triggering of an audible alarm notify the human driver. The external warning lights enable the other road users to be informed of the behavior of the vehicle.

A transition 249 is validated when the vehicle reaches a zero speed.

A validation of the transition 249 activates a step 250 which consists in engaging the automatic parking brake and returning to the initial step 140.

However, if a resumption of control by the human driver is observed before or during the automatic stopping procedure of the step 248, then the method hands control to the driver for example, but not necessarily, in the manner now explained.

A transition 245 explained later in the text making it possible to activate a semi-autonomous mode is eligible for validation equally from a logical conjunction of the step 242 and of the step 244 or from a logical conjunction of the step 244 and of the step 246.

The transition 245 for activating the semi-autonomous mode is also eligible for validation from a logical conjunction of the step 244 and of the automatic stopping step 248 which is activated by the transition 247 validated in the absence of intervention from the human driver when the vehicle approaches an end of zone of driving possible in autonomous mode as displayed in step 246.

At any moment from the step 246 or from the step 248 as long as the step 250 is not reached, the transition 245 is validated when the automated system detects a torque applied to the steering wheel or a press on the brake or accelerator pedal.

In other words, the human driver can take back control of the vehicle at any moment and thus counter the slowing down engaged in the step 248, notably to accelerate the vehicle and follow the road in manual mode.

A validation of the transition 245 from the step 244 of driving in autonomous mode in conjunction with one or other of steps 246 and 248 activates the step 340 of driving in semi-autonomous mode which provokes a slowing down of the vehicle similar to that of the step 248, or more pronounced than in step 248, so as to strongly urge the human driver to take back all control of the driving of the vehicle.

From the step 244 of autonomous mode activated, the transition 245 is validated by a manifestation of presence of the human driver when he or she wants to take back control of the vehicle in manual driving mode.

A validation of the transition 245 activates a step 340 of driving in semi-autonomous mode now explained with reference to FIG. 3.

More specifically, the transition 245 in fact combines two transitions of taking back control by the human driver. A transition 341 is validated when the automated system detects a torque applied to the steering wheel by the human driver to take back control of the lateral displacement. It is possible to use for this purpose, for example, the torque signal applied to a power steering wheel. In a possible variant, the automated system detects a presence of grasping of the steering wheel by the human driver by means of touch sensors arranged on the steering wheel. A transition 351 is validated when the automated system detects a load applied to the brake or accelerator pedal by the human driver to take back control of the longitudinal displacement.

A validation of the transition 341 activates an alarm step 342 in logical conjunction with the step 340 of driving in semi-autonomous mode. The alarm step 342 consists in prompting the human driver to quickly take back control of the longitudinal displacement which for the time being continues to be controlled by the automated system, by pressing on the brake or accelerator pedal, by means of a visual display and/or an audible message.

Simultaneously in one of the steps 340 or 342, the computer program arms a timer to measure a delay which separates the resumption of control of the pedals from the resumption of control of the steering wheel.

A transition 343 is validated when the delay is exceeded.

A validation of the transition 343 activates an automatic stopping step 344 which consists in braking the vehicle when the human driver does not quickly take back control of the longitudinal displacement which continues to be controlled by the automated system. During the braking of the vehicle in the step 344, the automated system recognizes the steering control which results from the torque applied to the steering wheel by the human driver. The slowing down of the vehicle is sufficiently discouraging to urge the human driver to rapidly take back full control of the vehicle.

A transition 345 is validated when the vehicle reaches a zero speed.

A validation of the transition 345 activates a step 346 which consists in engaging the automatic parking brake and returning to the initial step 140.

At any moment from the step 342 or from the step 344 as long as the step 346 is not reached, a transition 347 is validated when the automated system detects a press on the brake or accelerator pedal.

A validation of the transition 347 from the step 340 of driving in semi-autonomous mode in conjunction with the steps 342 and 344 reactivates the step 144 of driving in manual mode explained previously with reference to FIG. 1.

A validation of the transition 351 activates an alarm step 352 in logical conjunction with the step 340 of driving in semi-autonomous mode. The alarm step 352 consists in prompting the human driver to quickly take back control of the lateral displacement which for the time being continues to be controlled by the automated system, by gripping the steering wheel, by means of a visual display and/or an audible message.

Simultaneously in one of the steps 340 or 352, the computer program arms a timer to measure a delay which separates the resumption of control of the steering wheel from the resumption of control of the pedals.

A transition 353 is validated when the delay is exceeded.

A validation of the transition 353 activates an automatic stopping step 354 which consists in braking the vehicle when the human driver does not quickly take back control of the lateral displacement which continues to be controlled by the automated system. During the braking of the vehicle in the step 344, the automated system recognizes the braking control which results from the pressure applied to the brake pedal by the human driver. However, a detection of pressure on the accelerator pedal has no effect on the braking imposed in the step 354. The slowing down of the vehicle is sufficiently discouraging to urge the human driver to quickly take back full control of the vehicle.

A transition 355 is validated when the vehicle reaches a zero speed.

A validation of the transition 355 activates a step 356 which consists in engaging the automatic parking brake and returning to the initial step 140.

At any moment from the step 352 or from the step 354 as long as the step 356 is not reached, a transition 357 is validated when the automated system detects a torque applied manually to the steering wheel.

A validation of the transition 357 from the step 340 of driving in semi-autonomous mode in conjunction with the steps 352 and 354 reactivates the step 144 of driving in manual mode explained previously with reference to FIG. 1.

In a variant embodiment, the transition 355 and step 356 can be replaced respectively by the transition 345 and the step 346 which are similar to them.

Thus, the return to manual driving mode to leave the autonomous driving mode via the semi-autonomous mode is activated when the human driver takes back control of the longitudinal displacement and the lateral displacement. The transitional switch to autonomous mode is short-lived if the human driver simultaneously or quasi-simultaneously takes back control of the longitudinal displacement and the lateral displacement, the transitions 347 and 357 being immediately validated following the transitions 341 and 351.

The optional mode of implementation of the method presented here with reference to FIG. 3 offers the possibility of reverting to autonomous driving mode when the resumption of control of a control by the human driver is not sufficiently asserted to mark a firm will on the part of the human driver to return to manual driving mode.

In the step 342, the automated system temporarily stores a maximum torque level applied to the steering wheel from the validation of the transition 341 and arms a short-term timer, for example of the order of three seconds.

A transition 349 of rapid releasing of the steering wheel is validated when the maximum torque level temporarily stored is below a predefined threshold and the human driver rapidly releases his or her control on the lateral displacement before the short term of the timer runs out.

In the step 352, the automated system temporarily stores a maximum pressure level applied to one of the pedals from the validation of the transition 351 and arms a short-term timer, for example of the order of three seconds.

A transition 359 of rapid releasing of the pedal is validated when the maximum pressure level temporarily stored is below a predefined threshold and the human driver rapidly releases his or her control on the longitudinal displacement before the short term of the timer runs out.

A validation of the transition 349 or of the transition 359 from the step 340 of driving in semi-autonomous mode then reactivates the step 244 of driving in autonomous mode explained above with reference to FIG. 2.

The autonomous mode can be exited at any instant upon the initiative of the human driver by passing through the semi-autonomous mode, reversibly or irreversibly as a function of the existence or not of the transitions 349, 359.

Other exits from the autonomous mode can be envisaged without departing from the context of the present invention regardless of the autonomous mode structure chosen.

The invention claimed is:

1. A method for operating a vehicle comprising:
   driving in manual mode in which a longitudinal displacement and a lateral displacement are controlled by a human driver, and driving in autonomous mode in which the longitudinal displacement and the lateral displacement are controlled by an automated system;
   alerting the human driver activated at least in the autonomous mode when the automated system receives a first distance which separates the vehicle from an end of zone in which the autonomous mode is authorized; and
   automatically stopping the vehicle before reaching the end of zone, said automatically stopping the vehicle being:
   activated in the autonomous mode when the human driver does not take back control of the vehicle after the reception of said first distance by the automated system, and
   activated in a semi-autonomous mode when the human driver takes back control of one of the longitudinal displacement and the lateral displacement, but not both of the longitudinal displacement and the lateral displacement within a predetermined time period after taking back control of said one of the longitudinal displacement and the lateral displacement of the vehicle.

2. The method as claimed in claim 1, wherein the automated system computes a second distance making it possible to stop the vehicle as a function of a deceleration accessed and/or computed by the automated system to be used in the automatic stopping.

3. The method as claimed in claim 2, wherein the automatically stopping the vehicle is activated when the first distance is less than or equal to the second distance.

4. The method as claimed in claim 2, wherein the second distance is computed from a maximum speed authorized over the first distance.

5. The method as claimed in claim 2, wherein the deceleration is of constant gauged value for the vehicle and the second distance comprises a first length proportional to a square of speed of the vehicle and inversely proportional to twice the deceleration.

6. The method as claimed in claim 5, wherein second distance comprises a fixed second length added to the first length.

7. The method as claimed in claim 2, wherein the deceleration is of a predetermined value.

8. A non-transitory computer-readable storage medium storing computer-readable instructions that, when executed by a computer, cause the computer to perform a method comprising:
   driving in a manual mode in which a longitudinal displacement and a lateral displacement are controlled by a human driver, and driving in an autonomous mode in which the longitudinal displacement and the lateral displacement are controlled by an automated system;
   alerting the human driver activated at least in the autonomous mode when the automated system receives a first distance which separates the vehicle from an end of zone in which the autonomous mode is authorized; and
   automatically stopping the vehicle before reaching the end of zone, said automatically stopping the vehicle being:
   activated in the autonomous mode when the human driver does not take back control of the vehicle after the reception of said first distance by the automated system, and
   activated in a semi-autonomous mode when the human driver takes back control of one of the longitudinal displacement and the lateral displacement, but not both of the longitudinal displacement and the lateral displacement within a predetermined time period after taking back control of said one of the longitudinal displacement and the lateral displacement of the vehicle.

9. An automated system comprising:
   circuitry configured to
   drive in a manual mode in which a longitudinal displacement and a lateral displacement are controlled by a human driver, and drive in an autonomous mode in which the longitudinal displacement and the lateral displacement are controlled by an automated system,
   alert the human driver activated at least in autonomous mode when the automated system receives a first distance which separates the vehicle from an end of zone in which the autonomous mode is authorized, and
   automatically stop the vehicle before reaching the end of zone, said automatically stopping the vehicle being:
   activated in the autonomous mode when the human driver does not take back control of the vehicle after the reception of said first distance by the automated system, and
   activated in a semi-autonomous mode when the human driver takes back control of one of the longitudinal displacement and the lateral displacement, but not both of the longitudinal displacement and the lateral displacement within a predetermined time period after taking back control of said one of the longitudinal displacement and the lateral displacement of the vehicle.

* * * * *